(12) United States Patent
Osborn et al.

(10) Patent No.: US 12,287,856 B2
(45) Date of Patent: Apr. 29, 2025

(54) COMPUTER-BASED SYSTEMS APPLYING TEXTUAL EMBEDDING SPACE SOFTWARE ENGINES TO AUTHENTICATION QUESTION AND ANSWERS FOR IDENTIFYING A USER AND METHODS OF USE THEREOF

(71) Applicant: Capital One Services, LLC, McLean, VA (US)

(72) Inventors: Kevin Osborn, Newton Highlands, MA (US); Brian McClanahan, Hyattsville, MD (US)

(73) Assignee: Capital One Services, LLC, McLean, VA (US)

( * ) Notice: Subject to any disclaimer, the term of this patent is extended or adjusted under 35 U.S.C. 154(b) by 302 days.

(21) Appl. No.: 17/942,401

(22) Filed: Sep. 12, 2022

(65) Prior Publication Data
US 2024/0086501 A1    Mar. 14, 2024

(51) Int. Cl.
G06F 21/31 (2013.01)
(52) U.S. Cl.
CPC .................................. G06F 21/31 (2013.01)
(58) Field of Classification Search
CPC ...................................................... G06F 21/31
See application file for complete search history.

(56) References Cited

U.S. PATENT DOCUMENTS

| | | | |
|---|---|---|---|
| 9,020,862 B2 | 4/2015 | Ni et al. | |
| 9,384,450 B1 | 7/2016 | Cordes et al. | |
| 10,719,666 B1 | 7/2020 | Walters et al. | |
| 2008/0134317 A1* | 6/2008 | Boss | H04L 63/083 726/18 |
| 2016/0036807 A1* | 2/2016 | Knauss | H04L 63/0838 726/7 |
| 2016/0277392 A1* | 9/2016 | Knauss | G06F 21/32 |
| 2017/0187709 A1* | 6/2017 | Rotem | G06F 21/31 |
| 2018/0052981 A1* | 2/2018 | Nygate | G06N 20/00 |
| 2020/0074054 A1* | 3/2020 | Nygate | G06F 21/316 |
| 2021/0056186 A1* | 2/2021 | Nygate | G06N 5/04 |
| 2021/0240939 A1* | 8/2021 | Walters | G06N 3/044 |
| 2022/0278975 A1* | 9/2022 | Benkreira | H04L 63/08 |

* cited by examiner

Primary Examiner — Yonas A Bayou
(74) Attorney, Agent, or Firm — Greenberg Traurig, LLP

(57) ABSTRACT

A method and system performed by a processor includes receiving from a verified user, an authentication answer for identity-authentication questions. An authentication answer embedding vector in a textual embedding space is generated by inputting each authentication answer into an embedding engine and stored. An unverified-user authentication answer is received, in response to posing to the unverified user, a specific identity-authentication question of the verified user. An unverified-user authentication answer embedding vector is generated using the embedding engine. An embedding space distance is computed between the unverified-user authentication answer embedding vector and the authentication answer embedding vector for the specific identity-authentication question of the verified user posed to the unverified user. A similarity score based on the embedding space distance is computed. The unverified user is identified as the verified user when the similarity score is higher than a predefined threshold score.

20 Claims, 9 Drawing Sheets

200

100  10  1010
GOING TO A MET'S GAME → EVV = {100, 10, 1010} — 250

100  10
GOING TO A BASEBALL GAME → EVU = {100, 10, 1000} — 260
1000

100
GOING TO THE BEACH → EVU = {100, 10, 6000} — 270
10  6000

IDENTITY AUTHENTICATION

WHO WAS YOUR FAVORITE TEACHER IN 7TH GRADE? — 175
(TYPE IN ANSWER BELOW)
A1. MRS. SMITH — 180
WHY? — 185
(TYPE IN ANSWER BELOW)
A2. SHE EXPLAINED ALGEBRA VERY WELL — 190

COMPUTER-BASED SYSTEMS APPLYING TEXTUAL EMBEDDING SPACE SOFTWARE ENGINES TO AUTHENTICATION QUESTION AND ANSWERS FOR IDENTIFYING A USER AND METHODS OF USE THEREOF

FIELD OF TECHNOLOGY

The present disclosure generally relates to computer-based systems applying textual embedding space software engines to authentication question and answers for identifying a user and methods of use thereof.

BACKGROUND OF TECHNOLOGY

A computer network platform/system may include a group of computers (e.g., clients, servers, smart routers) and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based method performed by a processor that may include receiving at least one authentication answer to each of a plurality of identity-authentication questions from at least one verified user. The at least one authentication answer may include at least one word, at least one phrase of words, or any combination thereof. At least one authentication answer embedding vector in a textual embedding space may be generated by inputting the at least one authentication answer into at least one embedding engine. The at least one authentication answer embedding vector in the textual embedding space may represent a location in the textual embedding space. The location in the textual embedding space may represent (1) the at least one word in the at least one authentication answer, and (2) a discourse of the at least one phrase of words in the at least one authentication answer. The discourse may be based on the at least one word in the at least one authentication answer. The at least one authentication answer embedding vector for each of the plurality of identity-authentication questions of the at least one verified user may be stored in a non-transient memory. At least one unverified-user authentication answer for at least one specific identity-authentication question from the plurality of identity-authentication questions of the at least one verified user may be received, in response to posing to at least one unverified user in an identity-authentication session, the at least one specific identity-authentication question. At least one unverified-user authentication answer embedding vector may be generated representing at least one unverified-user authentication answer location in the textual embedding space by inputting the at least one unverified-user authentication answer into the at least one embedding engine for each of the at least one specific identity-authentication question. An embedding space distance may be computed between the at least one unverified-user authentication answer location and the location in the textual embedding space of the at least one authentication answer embedding vector for each of the at least one specific identity-authentication question of the at least one verified user posed to the at least one unverified user. An accumulated similarity score may be computed based the embedding space distance computed for each of the at least one specific identity-authentication question posed to the at least one unverified user. The at least one unverified user may be identified as the at least one verified user when the accumulated similarity score is higher than a predefined verification threshold score.

In some embodiments, the present disclosure provides an exemplary technically improved computer-based system that includes at least the following components of a non-transient memory and a processor. The processor may be configured to receive at least one authentication answer to each of a plurality of identity-authentication questions from at least one verified user, where the at least one authentication answer may include at least one word, at least one phrase of words, or any combination thereof, to generate at least one authentication answer embedding vector in a textual embedding space by inputting the at least one authentication answer into at least one embedding engine, where the at least one authentication answer embedding vector in the textual embedding space may represent a location in the textual embedding space, where the location in the textual embedding space may represents (i) the at least one word in the at least one authentication answer, and (ii) a discourse of the at least one phrase of words in the at least one authentication answer, where the discourse may be based on the at least one word in the at least one authentication answer, to store the at least one authentication answer embedding vector for each of the plurality of identity-authentication questions of the at least one verified user in the non-transient memory, to receive at least one unverified-user authentication answer for at least one specific identity-authentication question from the plurality of identity-authentication questions of the at least one verified user, in response to posing to at least one unverified user in an identity-authentication session, the at least one specific identity-authentication question, to generate at least one unverified-user authentication answer embedding vector representing at least one unverified-user authentication answer location in the textual embedding space by inputting the at least one unverified-user authentication answer into the at least one embedding engine for each of the at least one specific identity-authentication question, to compute an embedding space distance between the at least one unverified-user authentication answer location and the location in the textual embedding space of the at least one authentication answer embedding vector for each of the at least one specific identity-authentication question of the at least one verified user posed to the at least one unverified user, to compute an accumulated similarity score based the embedding space distance computed for each of the at least one specific identity-authentication question posed to the at least one unverified user, and to identify the at least one unverified user as the at least one verified user when the accumulated similarity score is higher than a predefined verification threshold score.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 3 illustrates exemplary embedded vectors generated from the unverified-user and verified-user authentication answers in accordance with one or more embodiments of the present disclosure;

FIG. 4 illustrates an authentication session that uses both open-ended and closed-ended identity-authentication questions in accordance with one or more embodiments of the present disclosure;

DETAILED DESCRIPTION

Figure 1:
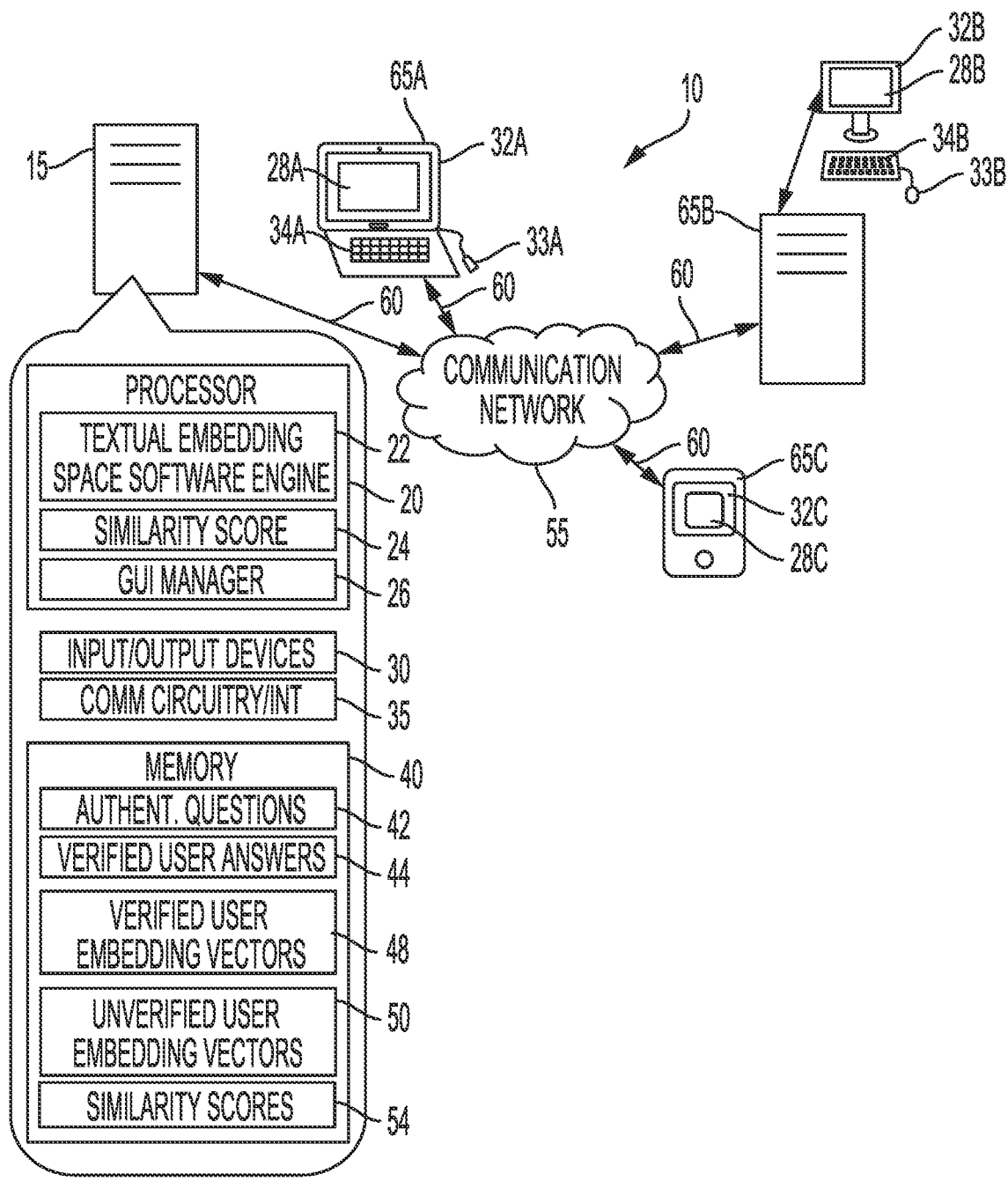
FIG. 1 is a diagram of an exemplary computer-based system for applying textual embedding space software engines to authentication question and answers for identifying a user, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" may correspond to any behavior that is dynamically determined during an execution of a software application or at least a portion of software application.

When a customer requests to perform high risk account activities in financial accounts managed by an entity, such as changing a password, requesting to transfer large sums of money, or changing personal details, such as contact details, related to a credit card account for example, the entity may need to identify whether the customer is the real customer (e.g., the account owner) or a fraudster. Today, 80% of calls into a customer call center of a financial institution are fraudulent calls. In an attempt to identify a customer as being the real customer and not a fraudster, when the real customer opens up the account, the financial institution may pose a series of closed-ended identity-authentication questions to the customer. These closed-ended identity-authentication questions, may be where there is one correct fixed answer usually based only on the personal knowledge of the customer, such as "What is your mother's maiden name?", or "What is the elementary school that you attended in first grade?" The answers to these questions have only one exact response, such as an exact name or exact school name in these examples. Thus, when the user attempts to perform high-risk operations in an account of the entity, the computing system of the entity may initiate a knowledge-based authentication (KBA) session posing these KBA questions to the user. To verify the identity of the user, the user must provide the exact answers to the KBA questions.

These knowledge-based authentication (KBA) schemes are not limited to financial institutions but may be used by any user wishing to gain access to performing computer system management and/or security functions in a secure computing system of any entity, or gaining access to health records, for example.

Nevertheless, fraudsters attempting to access a person's account may find the answers to KBA questions in the customer's personal information, for example, on the dark web, or through criminal hackers selling personal information from a hacked database. Thus, the fraudster may receive a customer's personal information, which may be used to provide these exact fixed answers in an authentication session with the financial institution using these KBA schemes, to gain access to the real customer's account. Thus, there is need in the art for additional KBA schemes that are secure and known only to the customer but are not based on a customer providing exact answers to KBA questions that are easily hacked by fraudsters.

The terms customer, person, and user may be used interchangeably herein.

Embodiments of the present disclosure herein disclose systems and methods for applying textual embedding space software engines to authentication question and answers for identifying a user. When a user opens an account, that may be a computer system account, an internet account, a cell phone account, a financial account, for example, the user may be asked to provide an answer to a series of identity-authentication questions based on information known only to the user. However, the answers are not based on an exact answer such as a name, address, or other personal identifiable information of the user, but a text or phrase response that may have many variations which are semantically similar, and/or contextually (discourse) similar. Later, such as after a year, for example, when the user is posed these questions in an authentication session, the given answers may not have exactly the same words given when opening the account. A verification of the unverified user as the real verified user and not a fraudster may be based on a measure of the semantic and/or discourse similarity between the answer given by the verified user when the account was opened and the answer given by the unverified user during the authentication session.

In the context as used herein, an open-ended question may refer to a question that cannot be answered with a static, unique response such as a simple one-or-two-word answer. An open-ended question may cause the user to answer in open text format such as a sentence and/or phrase based on the user's personal knowledge, feeling, and understanding such as for example, "What do you like to do in your free time and why?". Hence, a user's answer to an open-ended authentication question is known only to the user and not to fraudsters. Answers to open-ended authentication questions may not be based on a user's personal identifiable information (PIT), where the user's PII may be readily obtainable by fraudsters wishing to pose as the user by purchasing the user's PII, for example, from database hackers or obtained via the dark web.

For example, the user may be asked the open-ended question, "What are your favorite childhood memories?". At the time of account registration, the verified user may answer "I love our annual family get togethers at my grandparents' house". A year later, when the unverified user during an authentication session may be posed the same question, the unverified user, who is the real user, may answer "I loved our family Christmas party at my grandmother's house". The unverified user, who is a fraudster, may answer "I loved when my father took me to a New York Mets baseball game." Note that "I loved our family Christmas party at my grandmother's house" has both semantic and contextual similarly to "I love at our annual family get togethers at my grandparents' house" where the words "father" and "family" have semantic similarity. Conversely, there is no semantic and contextual similarity "I loved when my father took me to a New York Mets baseball game" to "I love at our annual family get togethers at my grandparents' house" so the system may identify that the unverified user giving this response is not the real user.

In some embodiments, the system for applying textual embedding space software engines to authentication question and answers for identifying a user may operate as described herein below. At least one authentication answer given by the verified user to each of a plurality of identity-authentication questions may be input into a machine learning algorithm, such as trained neural network model, known as an embedding engine, that may be configured to map each of the words and/or a discourse of phrases of words in the at least one authentication answer given by the verified user respectively into at least one authentication answer embedding vector in an n-dimensional textual embedding space.

In some embodiments, the exemplary open-ended questions and their answers as described hereinabove such as "What do you like to do in your free time and why?" and "What are your favorite childhood memories?" are non-limiting examples representative of the authentication questions and authentication answers that may be used be to verify an unverified user by applying the embedding engine to the authentication answer, for example, as described hereinbelow.

In some embodiments, at least one unverified user authentication answer may be input into the embedding engine. The machine learning algorithm of the embedding engine may map the at least one unverified user authentication answer into at least one unverified user authentication answer embedding vector in the n-dimensional textual embedding space. An embedding space distance between the location of the at least one unverified user authentication answer embedding vector and the location of the at least one authentication answer embedding vector in an n-dimensional textual embedding space may be computed.

In some embodiments, a similarity score based on the computed embedding space distance in the n-dimensional textual embedding space may be assigned to the at least one unverified user authentication answer given by the unverified user when posed any identity-authentication question from the plurality of identity-authentication questions. A higher similarity score or alternatively, a smaller computed embedding space distance may be indicative of words and/or phrases in the at least one unverified user authentication answer having a similar semantic context and/or discourse as corresponding to the at least one authentication answer given by the verified user when posed the same identity-authentication questions. Thus, a higher similarity score may be an indication that the unverified user is the real user, and a lower similarity score is indicative that the unverified user is a fraudster.

FIG. 1 is a diagram of an exemplary computer-based system 10 for applying textual embedding space software engines to authentication question and answers for identifying a user, in accordance with one or more embodiments of the present disclosure. System 10 may include a server 15, such as a server of an entity, communicating 60 over a communication network 55 with any number of remote computing devices 65 which may further include a laptop 65A (elements denoted with index A), a desktop 65B (elements denoted with index B), and a mobile computing device 65C (elements denoted with index C).

In some embodiments, as shown in inset 17, the server 15 may include a processor 20, input/output devices 30, a non-volatile memory 40, and communication circuitry/interface 35 for communicating 60 over communication network 55.

In some embodiments, the memory 40 may be configured to store identity-authentication questions for a plurality of users in an authentication questions database 42, a plurality of verified user authentication answers posed to the verified user (such as for example, during account opening) in a verified user authentication answers database 44, a plurality of verified user authentication answer embedding vectors in a verified user authentication answer embedding vector database 48, a plurality of unverified user authentication answer embedding vectors in an unverified user authentication answer embedding vectors database 50, and similarity scores in a similarity scores database 54.

In some embodiments, the processor 20 may be configured to execute code, which may include a textual embedding space software engine 22 (e.g., the machine learning algorithm) for processing and comparing an unverified user authentication answer given by the unverified user to a specific authentication question with a verified user answer given by the verified user to the same specific authentication question. The textual embedding space software engine 22 may generate the verified user authentication answer embedded vector and the unverified user authentication answer embedded vector in the n-dimensional textual embedding space. The processor 20 may execute a similarity score module 24 that may compute a embedding space distance between the verified user authentication answer embedded vector and the unverified user authentication answer embedded in the n-dimensional textual embedding space. The similarity score module 24 may use the computed embedding space distance for assigning similarity scores to each unverified user answer to each authentication question posed to the unverified user during an authentication session. The processor 20 may execute a graphic user interface (GUI) manager 26 which causes display 32 to display GUI 28.

In some embodiments, each of the remote computing devices 65 may include a display 32 on which a graphic user interface (GUI) 28 may be displayed, a keyboard 34 and/or a mouse 33. A user via the GUI 28 on the display 32 may request to perform a high-risk operation on a user's account managed by the entity via the server 15. In other embodiments, the display 32 may be a touchscreen with both input and output capabilities. The processor 20 via the GUI manager 26 of the server 15 may transmit the identity-authentication questions over the communication network 55 to the remote computing device 65 associated with the user to display on GUI 28. Similarly, GUI 28 may relay the answers by the user over the communication network 55 to the server 55.

In some embodiments, the GUI 28 may be used to display and receive inputs from the verified user when initially typing in answers to the authentication question posed to the verified user. Similarly, the same system configuration may be used to receive answers from an unverified user during an authentication session. In other embodiments, the remote computing device 65 may include a cellphone associated with the user displaying GUI 28 on the display 32 of the cellphone that is a touchscreen.

In some embodiments, the processor 20 of the server 15 and/or a processor of the remote computing device 65 may execute a speech-to-text conversion software (not shown). The processor 20 may receive from the unverified user, a text output from the speech-to-text conversion software from the unverified user speaking the unverified-user authentication answer over the communication channel 55, in response to being asked by a second user, the at least one specific identity-authentication question, spoken in a conversation with a second user.

Figure 2A:
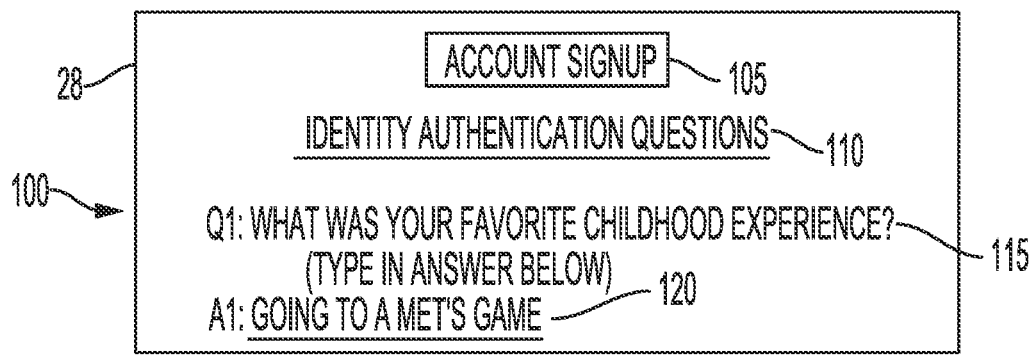
FIGS. 2A-2C are exemplary screen views of a graphic user interface for displaying authentication questions and answers, in accordance with one or more embodiments of the present disclosure.
Figure 2B:
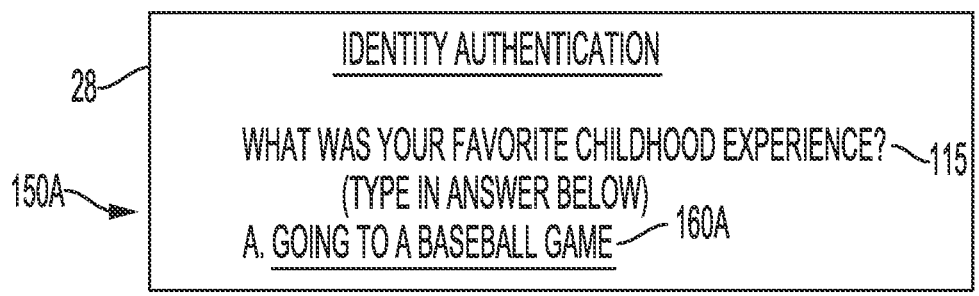
Figure 2C:
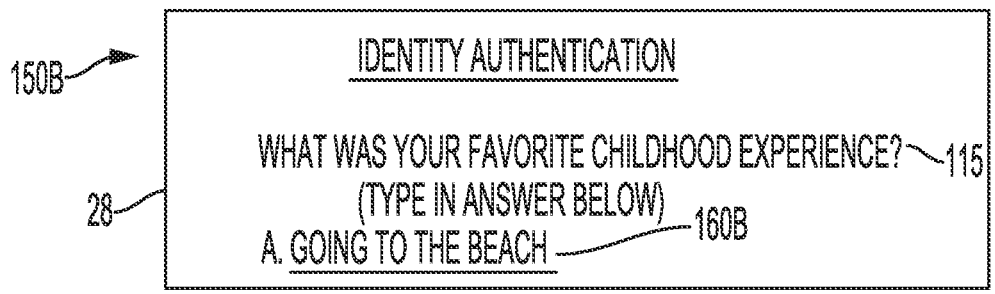

FIGS. 2A-2C are exemplary screen views of a graphic user interface for displaying authentication questions and answers, in accordance with one or more embodiments of the present disclosure.

FIG. 2A shows an exemplary screen view 100 during an account setup 105 in accordance with one or more embodiments of the present disclosure. The exemplary screen view 100 may be displayed, for example, on GUI 28 on display 32. The exemplary screen view 100 may pose to a user at the account setup 105, for example, a set of identity authentication questions 115 for the user to answer. The user is known here as a verified user in that the identity of the user at account setup or at any other suitable time in establishing the verified user's identity is made by other methods such as the user providing identification and other personal identifiable information (PII) to the entity managing the account before the user receives from the server 15, the set of identity authentication questions 115 to answer. In this case, a first identity verification question 115 denoted Q1 may ask an open-ended question that does not have one unique answer such as "What was your favorite childhood experience?" The GUI 28 may include a field for the user to type a verified-user authentication answer 120, for example, "Going to a Met's game".

FIG. 2B shows an exemplary screen view 150A to a first answer 160A to an exemplary authentication question 115 in accordance with one or more embodiments of the present disclosure. The exemplary screen views 150A may be displayed, for example, on GUI 28 on display 32. When an unverified user requests to perform, for example, high-risk operations in the account of the verified (real) user, the server 15 may detect the high-risk operation request triggering an identity authentication session. The processor 20 may fetch from the authentication question database 42, the set of identity authentication questions (originally posed to the verified user at account setup) to pose to the unverified user. The server 15 via the GUI Manager 26 may send instructions to the remote computing device 65 associated with the unverified user to display on the GUI 28 of the display 32, an Identity Authentication notification to the unverified user and so as to pose the identity authentication question 115 to the unverified user, "What was your favorite childhood memory?". In response, the unverified user may provide via the GUI 28, an unverified-user authentication answer 160A "Going to a baseball game".

FIG. 2C shows an exemplary screen view 150B to a second answer 160B to the exemplary authentication question 115 in accordance with one or more embodiments of the present disclosure. The exemplary screen views 150B may be displayed, for example, on GUI 28 on display 32. The server 15 via the GUI Manager 26 may send instructions to the remote computing device 65 associated with the unverified user to display on the GUI 28 of the display 32, an Identity Authentication notification to the unverified user and so as to pose the identity authentication question 115 to the unverified user, "What was your favorite childhood memory?". In response, the unverified user may provide via the GUI 28, an unverified-user authentication answer 160B "Going to the beach".

FIG. 3 illustrates exemplary embedded vectors 200 generated from the unverified-user and verified-user authentication answers in accordance with one or more embodiments of the present disclosure. For the exemplary embodiments shown in FIGS. 2A-2C, an embedding engine may convert words in the authentication answers to numbers, the numbers may be also referred to herein as numerical tokens, so as to generate an authentication answer embedding vector based on at least one word in the authentication answers, and/or on a discourse of a least one phrase of words in the authentication answers. The authentication answer embedding vector may be indicative of a location in the n-dimensional textual embedding space.

For example, consider a simplistic 3-dimensional textual embedding space shown in FIG. 3, into which the authentication questions shown in FIGS. 2A-2C may be mapped into. One dimension in the 3-dimensional textual embedding space may represent a library of gerunds such as running, going, crying, playing, barking, etc. Another dimension in this example may be prepositions to, at, from etc. Another dimension may be entertainment places and/or activities such as a Met's game, a baseball game, a sports game, a movie, a beach, a country (e.g., for travel), etc. This exemplary embedding engine may assign numerical tokens such as, for example, "going" as 100, "barking" as 300, "to" as 10, "from" as 20, "Met's game" as 1010, "baseball game" as 1000, "Yankee's game" as 1011, "Dodger's game" as 1012, "beach" as 6000, "Myrtle Beach" as 6005, "Miami Beach" as 6007, etc.

In some embodiments, the Textual Embedding Space Software Engine 22 may map the verified-user authentication answer 120 to a verified-user authentication answer embedded vector (EVV) 250 where EVV={100, 10, 1010}, the unverified-user authentication answer 160A to an unverified-user authentication answer embedded vector (EVU) 260 where EVU={100, 10, 1000}, and the unverified-user authentication answer 160B to an unverified-user authentication answer embedded vector (EVU) 270 where EVU={100, 10,6000}.

In this 3-D embedding vector example, the unverified-user user authentication answer embedded vector (EVU) 260 may represent a first unverified-user authentication answer location location in 3-dimensional textual embedding space that is very close and almost coincident with a verified-user authentication answer location representing the verified-user embedded vector (EVV) 250. The embedding space distance between the first unverified-user authentication answer location and the verified-user authentication answer location is nearly zero, which may be concluded by inspection in taking the inner product of {100, 10, 1000} and {100, 10, 1010}. Stated differently, "Going to a Met's game" and "Going to a baseball game" are substantially the same in terms of semantic and/or discourse similarity.

Conversely, the unverified-user embedded vector (EVU) 270 may represent a second unverified-user authentication answer location in 3-dimensional textual embedding space that is far from the verified-user authentication answer location representing the verified-user embedded vector (EVV) 250. The embedding space distance between the verified-user authentication answer location and the second unverified-user authentication answer location is large in this case, which may be concluded by inspection by taking the inner product of {100, 10, 1000} and {100, 10, 6000}. Stated differently, "Going to a Met's game" and "Going to the beach" do not possess semantic and/or discourse similarity.

Thus, for this 3-D embedding vector example. the unverified user providing the authentication answer 160A "Going to a baseball game" may be identified, based on the embedding space distance, as the real verified user, whereas the unverified user giving the authentication answer 160B "Going to the beach" may be identified as a potential fraudster. The real user was able to provide substantially the same authentication answer in terms of semantic and/or discourse similarity relative to the authentication answers given at the account setup 105.

In some embodiments, the similarity score module 24 may be configured to compute a similarity score based on the embedding space distance between the unverified-user authentication answer embedding vector and the verified-user authentication answer embedding vector for a given identity authentication question posed to the user. So for the two authentication answers 160A and 160B given by the unverified user in FIGS. 2B and 2C, the small embedding space distance for the authentication answer 160A may be assigned, for example, a similarity score of 95, and the larger embedding space distance for the authentication answer 160B may be assigned a similarity score of 65. The processor 20 may identify the unverified user as the real user when the similarity score is higher than a predefined verification threshold value such as 85, for example. The processor 20 assessing that the similarity score is below the predefined verification threshold value may identify the unverified user as a fraudster. These exemplary similarity score values of 85 and 65 as well as the predefined verification threshold value of 85 are merely for conceptual clarity, and not by way of limitation. Any suitable similarity score values and predefined verification threshold values may be used.

In some embodiments, the processor 20 may pose to the unverified user, a set of authentication questions. The similarity score module 24 may assign a similarity score for each unverified-user authentication answer given by the unverified user. The similarity score module 24 may then assign an accumulated similarity score based on each similarity score such as a weighted average of each similarity score assigned to each of the unverified-user authentication answers given to each of the authentication questions. In other embodiments, if only one authentication question is posed to the unverified user, then the accumulated similarity score in this case may be the similarity score assigned to the authentication answer for the one authentication question.

In some embodiments, the processor 20 may apply the predefined verification threshold value analysis to the accumulated similarity score so as to identify the unverified user as the real user or a fraudster.

The embodiments in FIGS. 2A-2C and FIG. 3 are shown merely for conceptual and visual clarity, and not by way of limitation of the embodiments disclosed herein. The 3-dimensional textual embedding space was constructed to conceptually illustrate the process of mapping between words to numerical tokens in the embedding vectors in the 3D textual embedding space. Typically, the Textual Embedding Space Software Engine 22 may evaluate each word, the position of each word in the sentence or phrase, groups of letters of each word, and/or a discourse of at least one word in the sentence and/or phrase of the authentication answers that may be mapped into an authentication answer embedding vector in the n-space textual embedding space, where n may be on the order of 100, 1000, 10000, and/or 100000, for example.

In some embodiments, the n-dimensional textual embedding space may also be referred to as a sentence embedding space, or a discourse-based sentence embedding space. Each phrase or sentence may be represented as an n-dimensional embedding vector in the textual embedding space. Furthermore, each embedding vector may include an array of numerical tokens representing coordinates of a location in the n-dimensional textual embedding space where each location may correspond to words, combinations of words, a discourse of the words of the phrase, or any combination thereof.

In some embodiments, the discourse may represent "what is being talked about" in the sentence and/or phrase. For example, the phrases "a fox eats a hen" and "a fox does not eat a hen" has the same words "fox" "eat" and "hen". However, the word "not" changes the discourse of the sentence, for example. In other embodiments, the embedding vector may be a word vector, a discourse vector, or a combination of the two in the n-dimensional textual embedding space that may be applied to the embodiments disclosed hereinabove.

In some embodiments, values of the numbers in the numerical tokens used in the n-elements of the n-dimensional embedding vector may represent a word, relationships between words, and/or a discourse in the phrase where the values of the numbers are based on the machine learning model used.

In some embodiments, any embedded vector in the textual embedding space may be a superposition of any combination of word vectors and/or discourse vectors in the n-dimensional textual embedding space. A word vector may capture lexical and/or semantic properties of a word in a given phrase or sentence when mapped into the textual embedding space. The discourse of a sentence or phrase may be mapped using the machine learning model into a discourse vector in the n-dimensional textual embedding space representing what is being talked about in the given phrase or sentence.

In some embodiments, the similarity score module 24 may compute a similarity score based on the embedding space distance between the unverified-user authentication answer embedding vector and the verified-user authentication answer embedding vector for a given identity authentication question posed to the user. In some embodiments, a large similarity score may be indicative that the unverified user is the real verified user. A small similarity score may be indicative of a fraudster where the server 15 associated with the entity, and where the server 15 may deny the fraudster from performing high-risk operations in an account associated with the verified user.

In some embodiments, the similarity score module 24 may compute an accumulated similarity score based on the authentication answers from the unverified user in response to a plurality of identify-authentication questions posed to the unverified user. In some embodiments, the accumulated similarity score may be based on a weighted averaged of each individual similarity score for each authentication answer received from the unverified user. In other embodiments, the accumulated similarity score may be based on an order that each identity authentication question from the plurality of identity-authentication questions that is posed to the unverified user.

In some embodiments, the similarity scores and/or accumulated similarity score for authentication answers given by the unverified user may be stored in the similarity scores database 54.

In some embodiments, the processor 20 may identify the unverified user as the real user when the accumulated similarity score is above a predefined verification threshold score. Conversely, the processor 20 may identify the unverified user as a fraudster when the accumulated similarity score is below the predefined verification threshold score. In other embodiments, the predefined verification threshold score may be based on a level of risk associated with a type of high-risk operation that the unverified user requested to perform in the account associated with the verified user. For example, the predefined verification threshold score, for requesting to transfer $10,000 or to change the password with a higher level of risk, for example, may be higher that the predefined verification threshold score requesting to change the address associated with the account of the verified user, for example, with a lower level of risk.

In some embodiments, the embedding vectors may be generated using elements in the textual embedding space selected from the group consisting of: word embeddings associated with each of the at least one word in the sentence and/or phrase, word vectors associated with each of the at least one word in the sentence and/or phrase, weighted averages of word vectors, and a discourse vector capturing correlations between word vectors of the at least one word and the discourse based on at least one word in the sentence and/or phrase.

In some embodiments, the plurality of the identity authentication questions, the verified-user authentication answers to the plurality of the identity authentication questions, the unverified-user authentication answers to the plurality of the identity authentication questions and/or an order that the plurality of the identity authentication questions may be posed to the unverified user may be inputted into the Textual Embedding Space Software Engine 22 so as to generate a plurality of composite embedding vectors that may be used to compute embedding space distances. These embedding space distances between the plurality of composite embedding vectors may be further needed for computing the accumulated similarity score.

In some embodiments, the processor 20 may receive the authentication answers 160A and/or 160B to the identity authentication question 115 posed to the unverified user that were transmitted from the remote computing device 65 over the communication network to the server 15. The textual embedding space software engine 22, or simply the embedding engine, may apply machine learning based algorithms to the unverified-user authentication answers 160A and/or 160B so as to generate unverified-user authentication question embedding vectors in the n-dimensional embedding space, which may be stored in the unverified user embedding vectors database 50. The processor 20 may fetch from the verified user authentication answer database 44, the verified user authentication answer for the same identity authentication question posed to the user. The Textual Embedding Space Software Engine 22 may also generate a verified user authentication answer embedded vector during account signup 105 that may be stored in the verified user embedding vector database 48.

In some embodiments, the processor 20 may encrypt each authentication answer embedding vector based on each authentication answer for each of the plurality of identity-authentication questions of the verified user using a cryptographic algorithm and then may securely store each authentication answer embedding vector related to each of the plurality of identity-authentication questions of the verified user in the verified user answers database 44 and/or the verified user embedding vectors database 48. This may ensure that a fraudster and/or hacker breaking into the databases may not be able to extract the authentication answers originally given by the verified user.

In some embodiments, the textual embedding space software engine 22 may compute the embedding space distance based on each of the plurality of identity-authentication questions after decrypting the encrypted authentication answer embedding vector using the cryptographic algorithm.

In some embodiments, the cryptographic algorithm may include a salted secure HASH algorithm. In other embodiments, the cryptographic algorithm may include the use of encryption keys.

In some embodiments, the Textual Embedding Space Software Engine 22 may include a machine learning model such as, for example, a neural network model such as a bidirectional encoder representations from transformers (BERT) model, a convolutional neural network model, and/or a recurrent neural network model. The BERT model may generate embedded vectors that may use a weighted sum of word vectors in the phrase itself. Additionally, the BERT model may output a word vector based on the discourse. For example, the word "cell" in "blood cell" may have a different word vector than "cell" in "prison cell".

In some embodiments, the Textual Embedding Space Software Engine 22 may use algorithms such as a Word2Vec algorithm, a Doc2Vec algorithm, a sentenceBERT algorithm, an InferSent algorithm, and/or a universal sentence encoder algorithm.

In some embodiments, the Textual Embedding Space Software Engine 22 may include the functions performed by the similarity score module 24.

In some embodiments, processor 20 may compute the embedding space distance between the verified-user authentication answer embedding vector and unverified-user authentication answer embedding vectors in the n-dimensional textual embedding space using a cosine similarity distance, a Euclidean (geometrical) distance, a Minkowski distance, a Manhattan distance, and/or a Levenshtein distance in n-space, for example.

The embodiments disclosed herein provide a technical solution to improve the accuracy of verifying the identity an unverified user as a real user or a fraudster through the use of open-ended identity authentication questions posed to the unverified user by applying textual embedding machine learning algorithms to the authentication answers given by the unverified user. The disclosed methods allow for a varied of answers to the open-ended questions that may have semantic and/or discourse similarity.

FIG. 4 illustrates an authentication session 170 that uses both open-ended and closed-ended identity-authentication questions in accordance with one or more embodiments of the present disclosure. Here, a closed-ended identity authentication question may be used with a related open-ended authentication question to improve the accuracy of identity verification process. For example, an unverified user may be asked a closed-ended identity authentication question 175 such as "Who was your favorite teacher in 7$^{th}$ Grade?". The unverified user may enter the authentication answer 180 "Mrs. Smith". In this case, the closed-ended question may require an exact answer. In the next identity authentication question, a related open-ended identity authentication question 185 of "Why?" may be posed to the unverified user, who may provide the authentication answer 190 "She explained algebra very well".

In some embodiments, when posing a plurality of mixed open-ended and close-ended identity authentication questions to the unverified user, the similarity score module 24 may simply apply a high similarity score to a correct answer and a low similarity score to a wrong answer to the closed-ended identity authentication 175 that may be used, for example, as a weighting in the computation of the accumulated similarity score. However, in the event that a fraudster managed to know that the 7$^{th}$ grade teacher of the real user was Mrs. Smith, the fraudster would then be required to answer the open-ended identity authentication 185 as to why the unverified user viewed Mrs. Smith as a favorite teacher in 7$^{th}$ grade. Using the textual embedding methods taught herein, the authentication answer such as "she taught math well" having semantic and/or discourse similarity to "She explained algebra well" would be indicative of the real user, whereas an answer "She always dismissed us from class five minutes early" may be indicative of a fraudster.

Figure 5:
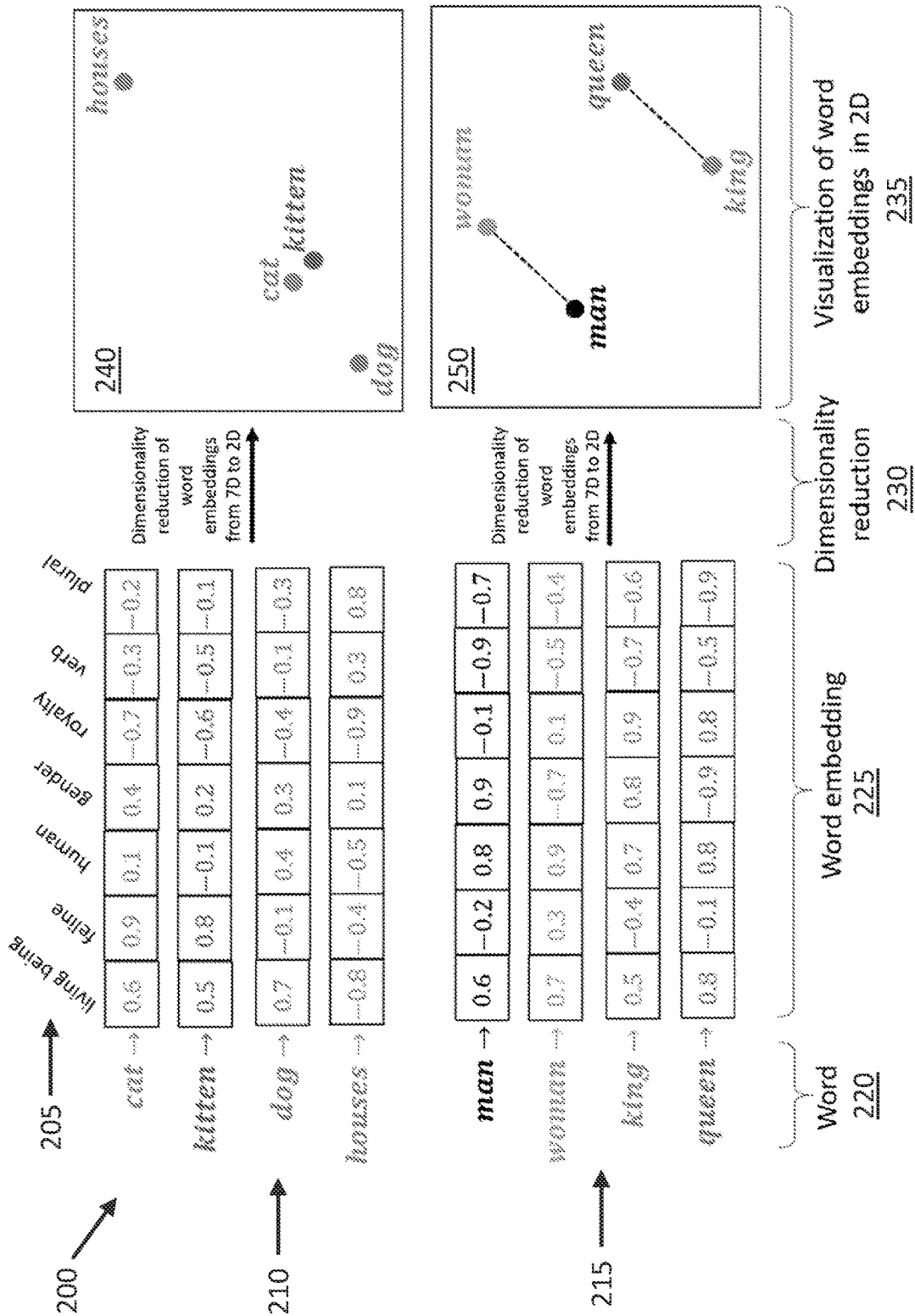
FIG. 5 illustrates an exemplary embodiment of a dimensionality reduction applied to a textual embedding space in accordance with one or more embodiments of the present disclosure.

FIG. 5 illustrates an exemplary embodiment 200 of dimensionality reduction 230 applied to a textual embedding space in accordance with one or more embodiments of the present disclosure. FIG. 5 illustrates a 7-dimensional (7D) textual embedding space 225 based on seven features 205 (e.g., living being, feline, human, gender, royalty, verb, plural) into which four words 220 (e.g., cat, kitten, dog, and houses) may be mapped to generate a first set 210 of four embedding vectors for cat, kitten, dog, and houses in the 7D textual embedding space 225. Similarly, another four words 220 (e.g., man, woman, king, and queen) may be mapped into the same 7D textual embedding space 225 to generate a second set 215 of four embedding vectors for man, woman, king, and queen.

In some embodiments, dimensionality reduction 230 may be applied to the first set 210 and the second set 215 of embedding vectors in the 7D textual embedding space 225 using dimensionality reduction algorithms to reduce an order of the 7D textual embedding space 225 to a two-dimensional embedding space. The 2D word embedding may be visualized in a 2D visualization 235. At a result, a plot 240 is a 2D visualization of the first set 210 of transformed 2D embedding vectors for cat, kitten, dog, and houses. Similarly, a plot 250 is a 2D visualization of the first set 210 of transformed 2D embedding vectors for man, woman, king, and queen. Note that in the same vein, the textual embedding space software engines may apply dimensionality reduction techniques, such as shown, for example, in the exemplary embodiments 200 of FIG. 5, to authentication question and answers in identifying a user in accordance with the methods disclosed herein.

Figure 6:
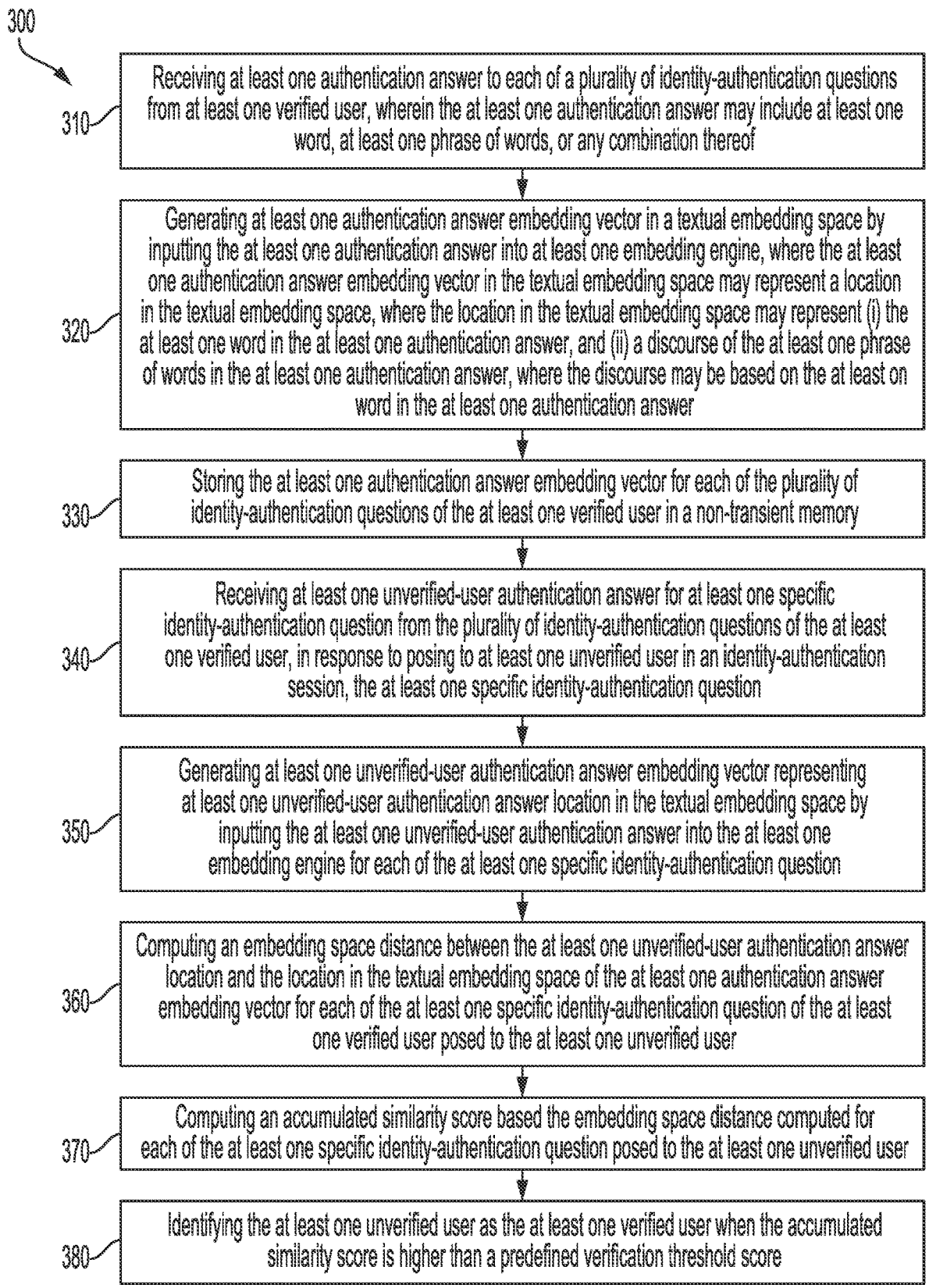
FIG. 6 illustrates a flowchart of an exemplary method for applying textual embedding space software engines to authentication question and answers for identifying a user, in accordance with one or more embodiments of the present disclosure.

FIG. 6 illustrates a flowchart of an exemplary method 300 for applying textual embedding space software engines to authentication question and answers for identifying a user, in accordance with one or more embodiments of the present disclosure. Method 300 may be performed by processor 20.

Method 300 may include receiving 310 at least one authentication answer to each of a plurality of identity-authentication questions from at least one verified user, wherein the at least one authentication answer may include at least one word, at least one phrase of words, or any combination thereof.

Method 300 may include generating 320 at least one authentication answer embedding vector in a textual embedding space by inputting the at least one authentication answer into at least one embedding engine, where the at least one authentication answer embedding vector in the textual embedding space may represent a location in the textual embedding space, where the location in the textual embedding space may represent (i) the at least one word in the at least one authentication answer, and (ii) a discourse of the at least one phrase of words in the at least one authentication answer, where the discourse may be based on the at least one word in the at least one authentication answer.

Method 300 may include storing 330 the at least one authentication answer embedding vector for each of the plurality of identity-authentication questions of the at least one verified user in a non-transient memory.

Method 300 may include receiving 340 at least one unverified-user authentication answer for at least one specific identity-authentication question from the plurality of identity-authentication questions of the at least one verified user, in response to posing to at least one unverified user in an identity-authentication session, the at least one specific identity-authentication question.

Method 300 may include generating 350 at least one unverified-user authentication answer embedding vector representing at least one unverified-user authentication answer location in the textual embedding space by inputting the at least one unverified-user authentication answer into the at least one embedding engine for each of the at least one specific identity-authentication question.

Method 300 may include computing 360 an embedding space distance between the at least one unverified-user authentication answer location and the location in the textual embedding space of the at least one authentication answer embedding vector for each of the at least one specific identity-authentication question of the at least one verified user posed to the at least one unverified user.

Method 300 may include computing 370 an accumulated similarity score based the embedding space distance computed for each of the at least one specific identity-authentication question posed to the at least one unverified user.

Method 300 may include identifying 390 the at least one unverified user as the at least one verified user when the accumulated similarity score is higher than a predefined verification threshold score.

In some embodiments, exemplary inventive, specially programmed computing systems/platforms with associated devices are configured via the communication circuitry and interface 30 in the server 15 and in each of the remote computing devices 65 (not shown) to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors such as the processor 20 and or the processor for each of the remote computing devices 65. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.). This may include, for example, the textual embedding space software engine 22, the similarity score module 24, and/or the GUI manager 26.

Examples of hardware elements may include processors (e.g., the processor 20 and each processor in each of the remote computing devices 65), microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth. This may include the server 15 and the remote computing devices 65.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples. This may include the server 15.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure such as the server 15 may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, exemplary inventive computer-based systems/platforms, exemplary inventive computer-based devices, and/or exemplary inventive computer-based components of the present disclosure may be configured to output to distinct, specifically programmed graphical user interface implementations (e.g., the GUI 28) of the present disclosure (e.g., a desktop, a web app., etc.). In various implementations of the present disclosure, a final output may be displayed on a displaying screen (e.g., the display 32) which may be, without limitation, a screen of a computer, a screen of a mobile device, or the like.

As used herein, the term "mobile electronic device," such as the remote computing devices 65C or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs). The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 7:
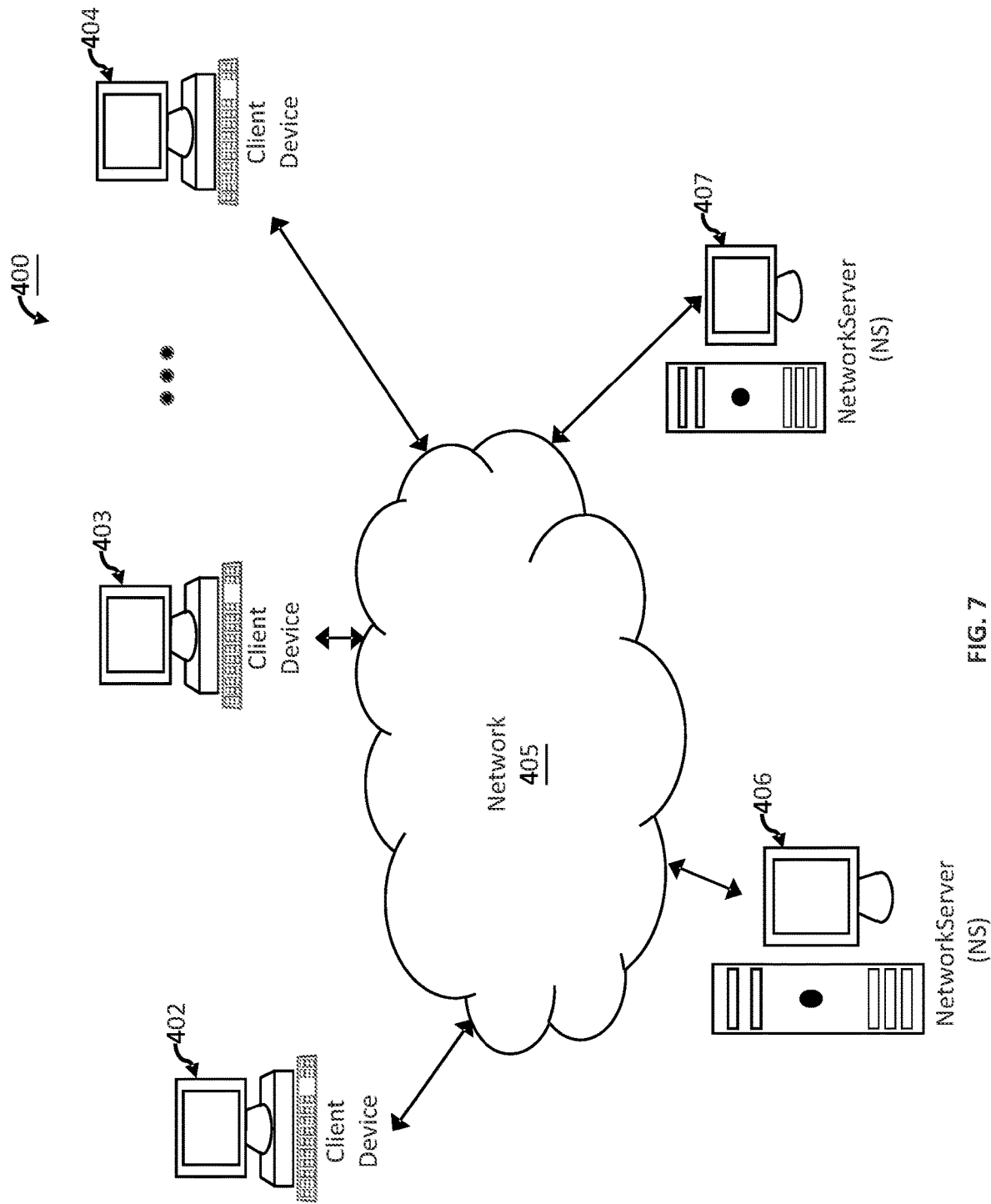
FIG. 7 depicts a block diagram of an exemplary computer-based system/platform in accordance with one or more embodiments of the present disclosure.

FIG. 7 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 7, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments and, optionally, in combination of any embodiment described above or below, the exemplary network 405 and the communication network 55 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof set by the communication circuitry 35 and for the communication circuitry in each of the remote computing devices 65. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 (either representing the server 15) may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing.

In some embodiments and, optionally, in combination of any embodiment described above or below, for example, one or more exemplary computing member devices 402-404 representative of the remote computing devices 65, the exemplary server 406, and/or the exemplary server 407 either representative of the server 15 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 8:
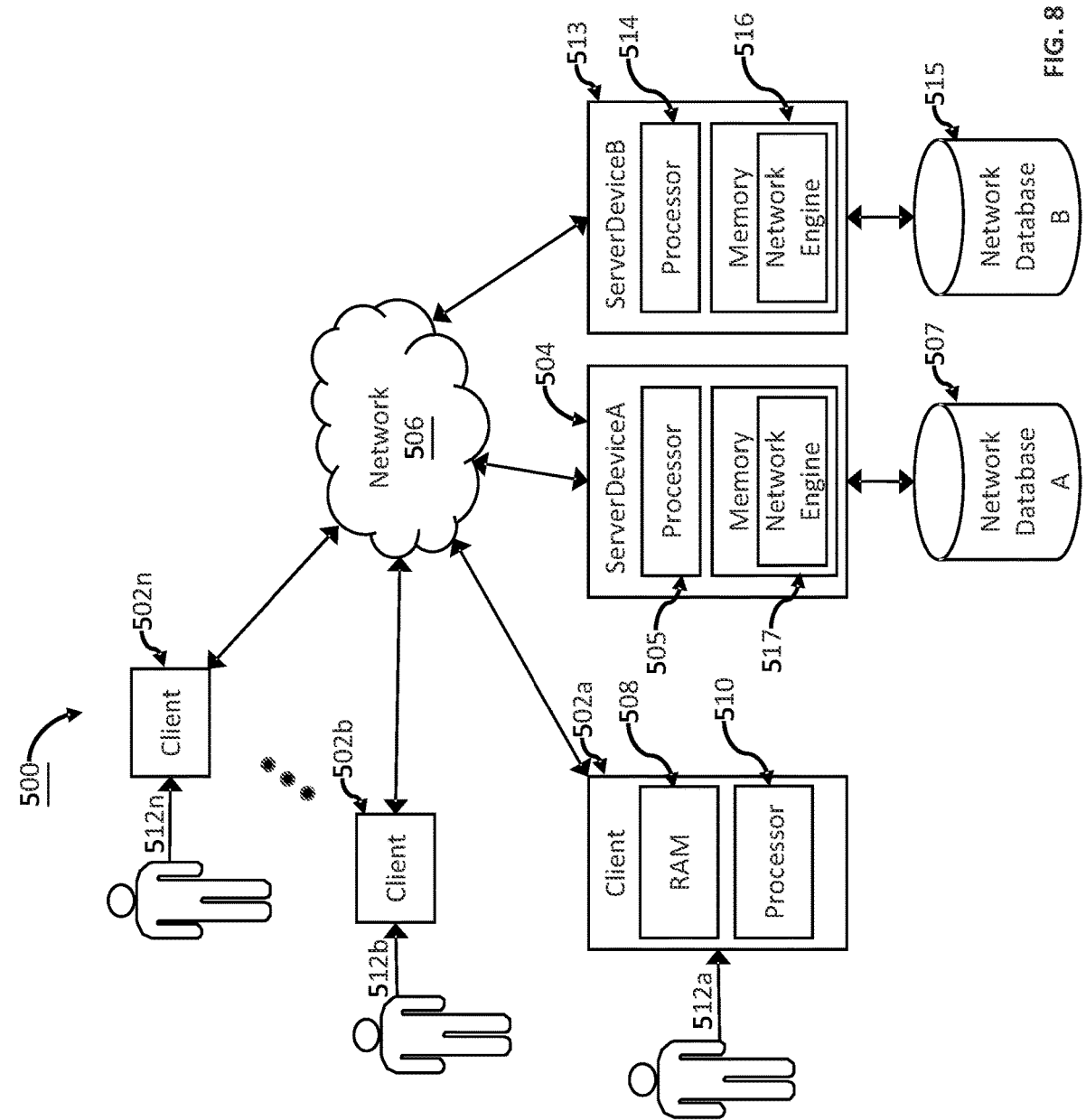
FIG. 8 depicts a block diagram of another exemplary computer-based system/platform in accordance with one or more embodiments of the present disclosure.

FIG. 8 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. This may include the memory 40 and each memory in each of the remote computing devices 65 (not shown). Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a-through 502n may also comprise a number of external or internal devices (e.g., the I/O devices 30 of the server 15 and/or the I/O devices of each of the remote computing devices 65, such as a mouse, a CD-ROM, DVD, a physical or virtual keyboard, a display, or other input or output devices. In some embodiments, examples of member computing devices 502a-through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a-through 502n may be specifically programmed with one or more application programs in accordance with one or more principles/methodologies detailed herein. In some embodiments, member computing devices 502a-through 502n may operate on any operating system capable of supporting a browser or browser-enabled application, such as Microsoft™ Windows™, and/or Linux. In some embodiments, member computing devices 502a-through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a-through 502n, users, 512a-through 512n, may communicate over the exemplary network 506 with each other and/or with other systems and/or devices coupled to the network 506. As shown in FIG. 8, exemplary server devices 504 and 513 may be also coupled to the network 506. In some embodiments, one or more member computing devices 502a-through 502n may be mobile clients.

In some embodiments, at least one database of exemplary databases 507 and 515, that may be representative of the databases stored in the memory 40 of FIG. 1, may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 9:
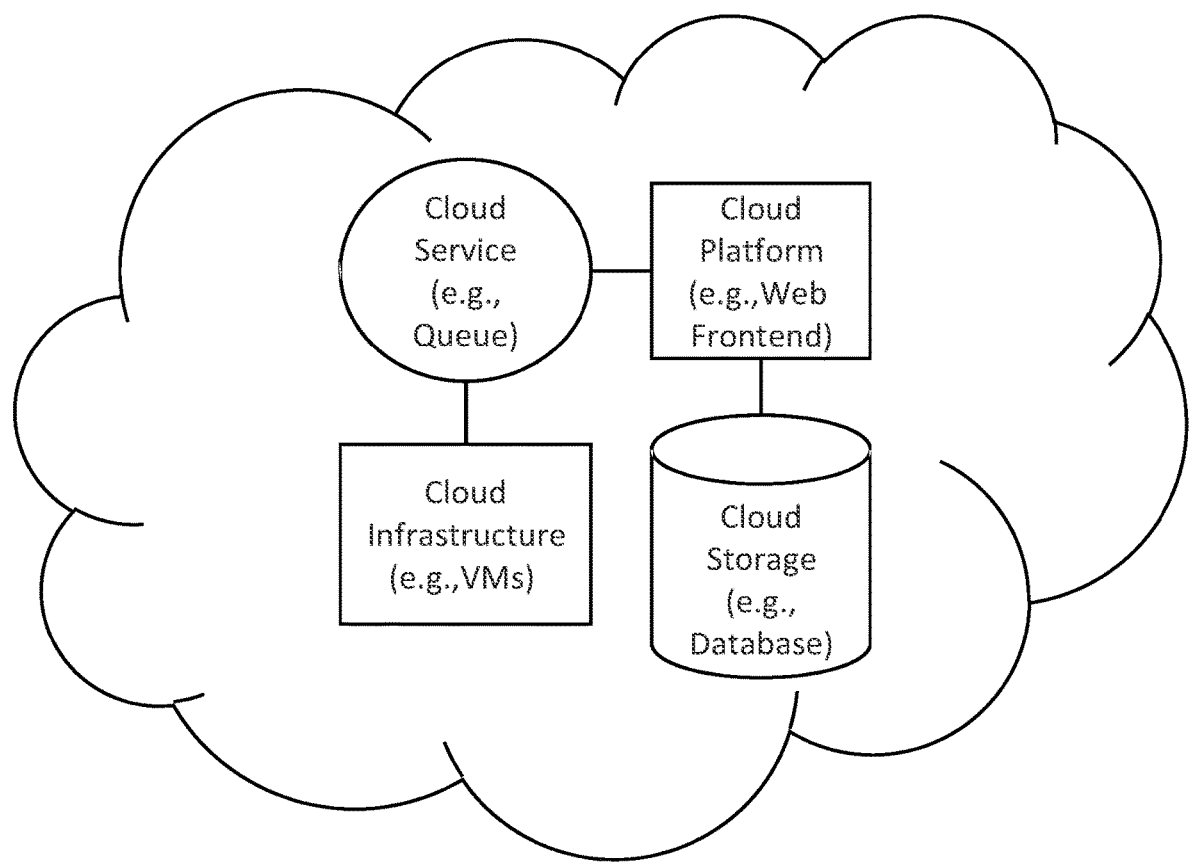
FIGS. 9 and 10 are diagrams illustrating implementations of cloud computing architecture/aspects with respect to which the disclosed technology may be specifically configured to operate, in accordance with one or more embodiments of the present disclosure.
Figure 10:
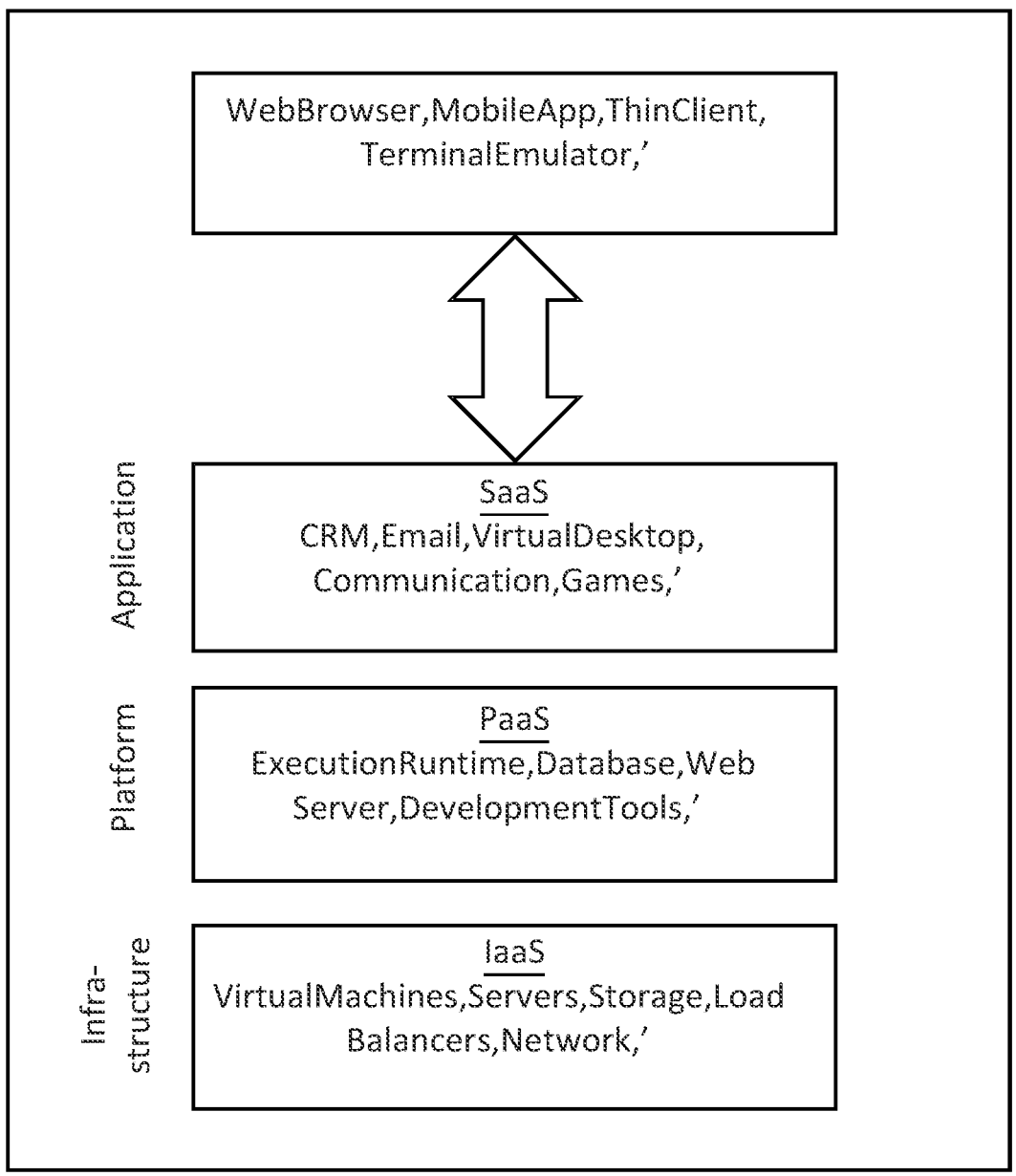

In some embodiments, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS), platform as a service (PaaS), and/or software as a service (SaaS). FIGS. 9 and 10 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques, such as those used in the textual embedding space software engine 22 and/or the similarity score module 24, chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  i) Define Neural Network architecture/model,
  ii) Transfer the input data to the exemplary neural network model,
  iii) Train the exemplary model incrementally,
  iv) determine the accuracy for a specific number of timesteps,
  v) apply the exemplary trained model to process the newly-received input data,
  vi) optionally and in parallel, continue to train the exemplary trained model with a predetermined periodicity.

In some embodiments and, optionally, in combination of any embodiment described above or below, the exemplary trained neural network model, such as those used in the textual embedding space software engine 22 and/or the similarity score module 24, may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

1. A method may include:
    receiving, by a processor, at least one authentication answer to each of a plurality of identity-authentication questions from at least one verified user;
        where the at least one authentication answer may include at least one word, at least one phrase of words, or any combination thereof;
    generating, by the processor, at least one authentication answer embedding vector in a textual embedding space by inputting the at least one authentication answer into at least one embedding engine;
    wherein the at least one authentication answer embedding vector in the textual embedding space may represent a location in the textual embedding space;
    wherein the location in the textual embedding space may represent:
        (i) the at least one word in the at least one authentication answer, and
        (ii) a discourse of the at least one phrase of words in the at least one authentication answer;
    wherein the discourse may be based on the at least one word in the at least one authentication answer;
    storing, by the processor, the at least one authentication answer embedding vector for each of the plurality of identity-authentication questions of the at least one verified user in a non-transient memory;
    receiving, by the processor, at least one unverified-user authentication answer for at least one specific identity-authentication question from the plurality of identity-authentication questions of the at least one verified user, in response to posing to at least one unverified user in an identity-authentication session, the at least one specific identity-authentication question;
    generating, by the processor, at least one unverified-user authentication answer embedding vector representing at least one unverified-user authentication answer location in the textual embedding space by inputting the at least one unverified-user authentication answer into the at least one embedding engine for each of the at least one specific identity-authentication question;
    computing, by the processor, an embedding space distance between the at least one unverified-user authentication answer location and the location in the textual embedding space of the at least one authentication answer embedding vector for each of the at least one specific identity-authentication question of the at least one verified user posed to the at least one unverified user;
    computing, by the processor, an accumulated similarity score based the embedding space distance computed for each of the at least one specific identity-authentication question posed to the at least one unverified user; and
    identifying, by the processor, the at least one unverified user as the at least one verified user when the accumulated similarity score is higher than a predefined verification threshold score. phrases, and at least one word and discourse in the candidate phrase.

2. The method as in clause 1, where the receiving of the at least one unverified-user authentication answer in the identity-authentication session may include receiving a request by the at least one verified user to perform high-risk operations in an account associated with the at least one verified user.

3. The method as in clause 2, where the predefined verification threshold score may be based on a level of risk to perform the high-risk operations.

4. The method as in clauses 1 or 2, where the storing of the at least one authentication answer embedding vector for each of the plurality of identity-authentication questions of the at least one verified user may include encrypting the at least one authentication answer embedding vector for each of the plurality of identity-authentication questions of the at least one verified user using a cryptographic algorithm.

5. The method as in clause 4, where the computing of the embedding space distance based on each of the at least one specific identity-authentication question may include decrypting the at least one authentication answer embedding vector for each of the at least one specific identity-authentication question using the cryptographic algorithm.

6. The method as in clauses 1, 2 or 4, where the cryptographic algorithm may include a salted secure HASH algorithm.

7. The method as in clauses 1, 2, 4, or 6, where the at least one authentication answer embedding vector may include an array of numerical tokens representing coordinates of the location in the textual embedding space.

8. The method as in clauses 1, 2, 4, 6, or 7, where the at least one embedding engine may use algorithms selected from the group consisting of a Word2Vec algorithm, a Doc2Vec algorithm, a sentenceBERT algorithm, an InferSent algorithm, and a universal sentence encoder algorithm.

9. The method as in clauses 1, 2, 4, 6, 7, or 8, where the receiving from the at least one unverified user, the at least one unverified-user authentication answer for the at least one specific identity-authentication question from the plurality of identity-authentication questions of the at least one verified user may include receiving a text output from a speech-to-text conversion algorithm in response to the at least one unverified user speaking the at least one unverified-user authentication answer over a communication channel in response to posing to the at least one unverified user in an identity-authentication session, the at least one specific identity-authentication question spoken in a conversation with a second user over the communication channel.

10. The method as in clauses 1, 2, 4, 6, 7, 8, or 9, where the computing of the accumulated similarity score may be based on an order in which each of the at least one specific identity-authentication question of the at least one verified user is posed to the at least one unverified user.

11. The method as in clauses 1, 2, 4, 6, 7, 8, 9, or 10, where computing the embedding space distance may include applying cosine similarity to the at least one unverified-user authentication answer embedding vector and the at least one authentication answer embedding vector for the at least one specific identity-authentication question of the at least one verified user posed to the at least one unverified user.

12. The method as in clauses 1, 2, 4, 6, 7, 8, 9, 10, or 11, where the method may include reducing, by the processor, an order of the textual embedding space using dimensionality reduction.

13. A system may include a non-transient memory and at least one processor. The at least one processor may be configured to execute software code stored in the non-transient memory that causes the at least one processor to:
    receive at least one authentication answer to each of a plurality of identity-authentication questions from at least one verified user;
        where the at least one authentication answer may include at least one word, at least one phrase of words, or any combination thereof;

generate at least one authentication answer embedding vector in a textual embedding space by inputting the at least one authentication answer into at least one embedding engine;

where the at least one authentication answer embedding vector in the textual embedding space may represent a location in the textual embedding space;

where the location in the textual embedding space may represent:

(i) the at least one word in the at least one authentication answer, and (ii) a discourse of the at least one phrase of words in the at least one authentication answer;

where the discourse may be based on the at least one word in the at least one authentication answer;

store the at least one authentication answer embedding vector for each of the plurality of identity-authentication questions of the at least one verified user in the non-transient memory;

receive at least one unverified-user authentication answer for at least one specific identity-authentication question from the plurality of identity-authentication questions of the at least one verified user, in response to posing to at least one unverified user in an identity-authentication session, the at least one specific identity-authentication question;

generate at least one unverified-user authentication answer embedding vector representing at least one unverified-user authentication answer location in the textual embedding space by inputting the at least one unverified-user authentication answer into the at least one embedding engine for each of the at least one specific identity-authentication question;

compute an embedding space distance between the at least one unverified-user authentication answer location and the location in the textual embedding space of the at least one authentication answer embedding vector for each of the at least one specific identity-authentication question of the at least one verified user posed to the at least one unverified user;

compute an accumulated similarity score based the embedding space distance computed for each of the at least one specific identity-authentication question posed to the at least one unverified user; and identify the at least one unverified user as the at least one verified user when the accumulated similarity score is higher than a predefined verification threshold score. phrases, and at least one word and discourse in the candidate phrase.

14. The system as in clause 13, where the at least one processor may be configured to receive the at least one unverified-user authentication answer in the identity-authentication session by receiving a request by the at least one verified user to perform high-risk operations in an account associated with the at least one verified user.

15. The system as in clause 13 or 14, where the predefined verification threshold score may be based on a level of risk to perform the high-risk operations.

16. The system as in clause 13 or 14, where the at least one processor may be configured to store the at least one authentication answer embedding vector for each of the plurality of identity-authentication questions of the at least one verified user by encrypting the at least one authentication answer embedding vector for each of the plurality of identity-authentication questions of the at least one verified user using a cryptographic algorithm.

17. The system as in clause 16, where the at least one processor may be configured to compute the embedding space distance based on each of the at least one specific identity-authentication question comprises decrypting the at least one authentication answer embedding vector for each of the at least one specific identity-authentication question using the cryptographic algorithm.

18. The system as in clauses 13, where the cryptographic algorithm may include a salted secure HASH algorithm.

19. The system as in clauses 13, 14, 16 or 18 where the at least one authentication answer embedding vector may include an array of numerical tokens representing coordinates of the location in the textual embedding space.

20. The system as in clauses 13, 14, 16, 18 or 19, where the at least one embedding engine may use algorithms selected from the group consisting of a Word2Vec algorithm, a Doc2Vec algorithm, a sentenceBERT algorithm, an InferSent algorithm, and a universal sentence encoder algorithm.

21. The system as in clauses 13, 14, 16, 18, 19 or 20, where the at least one processor may be configured to receive from the at least one unverified user, the at least one unverified-user authentication answer for the at least one specific identity-authentication question from the plurality of identity-authentication questions of the at least one verified user by receiving a text output from a speech-to-text conversion algorithm in response to the at least one unverified user speaking the at least one unverified-user authentication answer over a communication channel in response to posing to the at least one unverified user in an identity-authentication session, the at least one specific identity-authentication question spoken in a conversation with a second user over the communication channel.

22. The system as in clauses 13, 14, 16, 18, 19, 20 or 21, where the at least one processor may be configured to compute the accumulated similarity score based on an order in which each of the at least one specific identity-authentication question of the at least one verified user is posed to the at least one unverified user.

23. The system as in clauses 13, 14, 16, 18, 19, 20, 21 or 22, where the at least one processor may be configured to compute the embedding space distance by applying cosine similarity to the at least one unverified-user authentication answer embedding vector and the at least one authentication answer embedding vector for the at least one specific identity-authentication question of the at least one verified user posed to the at least one unverified user.

24. The system as in clauses 13, 14, 16, 18, 19, 20, 21. 22 or 23, where the at least one processor may be further configured to reduce an order of the textual embedding space using dimensionality reduction.

25. A system may include a non-transient memory and at least one processor. The at least one processor may be configured to execute software code stored in the non-transient memory that causes the at least one processor to:

receive at least one authentication answer to each of a plurality of identity-authentication questions from at least one verified user;

generate at least one authentication answer embedding vector in a textual embedding space by inputting the at least one authentication answer into at least one embedding engine;

where the at least one authentication answer embedding vector in the textual embedding space may represent a location in the textual embedding space;

where the location in the textual embedding space may represent:

(i) at least one word in the at least one authentication answer, and
(ii) a discourse of at least one phrase of words in the at least one authentication answer;
receive at least one unverified-user authentication answer for at least one specific identity-authentication question from the plurality of identity-authentication questions of the at least one verified user, in response to posing to at least one unverified user in an identity-authentication session, the at least one specific identity-authentication question;
generate at least one unverified-user authentication answer embedding vector representing at least one unverified-user authentication answer location in the textual embedding space by inputting the at least one unverified-user authentication answer into the at least one embedding engine for each of the at least one specific identity-authentication question;
compute an embedding space distance between the at least one unverified-user authentication answer location and the location in the textual embedding space of the at least one authentication answer embedding vector for each of the at least one specific identity-authentication question of the at least one verified user posed to the at least one unverified user;
compute an accumulated similarity score based the embedding space distance computed for each of the at least one specific identity-authentication question posed to the at least one unverified user; and
identify the at least one unverified user as the at least one verified user when the accumulated similarity score is higher than a predefined verification threshold score. phrases, and at least one word and discourse in the candidate phrase.

26. A system may include a non-transient memory and at least one processor. The at least one processor may be configured to execute software code stored in the non-transient memory that causes the at least one processor to:
receive at least one authentication answer to each of a plurality of identity-authentication questions from at least one verified user;
generate at least one authentication answer embedding vector in a textual embedding space by inputting the at least one authentication answer into at least one embedding engine;
where the at least one authentication answer embedding vector in the textual embedding space may represent a location in the textual embedding space;
where the location in the textual embedding space may represent:
(i) at least one word in the at least one authentication answer, and
(ii) a discourse of at least one phrase of words in the at least one authentication answer;
receive at least one unverified-user authentication answer for at least one specific identity-authentication question from the plurality of identity-authentication questions of the at least one verified user, in response to posing to at least one unverified user in an identity-authentication session, the at least one specific identity-authentication question;
generate at least one unverified-user authentication answer embedding vector representing at least one unverified-user authentication answer location in the textual embedding space by inputting the at least one unverified-user authentication answer into the at least one embedding engine for each of the at least one specific identity-authentication question;
compute an embedding space distance by applying cosine similarity to the at least one unverified-user authentication answer location and the location in the textual embedding space of the at least one authentication answer embedding vector for each of the at least one specific identity-authentication question of the at least one verified user posed to the at least one unverified user;
compute an accumulated similarity score based the embedding space distance computed for each of the at least one specific identity-authentication question posed to the at least one unverified user; and
identify the at least one unverified user as the at least one verified user when the accumulated similarity score is higher than a predefined verification threshold score. phrases, and at least one word and discourse in the candidate phrase.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method, comprising:
receiving, by a processor, at least one authentication answer to each of a plurality of identity-authentication questions provided in an initial authentication question-answer registration by at least one verified user;
wherein the at least one authentication answer comprises at least one word, at least one phrase of words, or any combination thereof;
generating, by the processor, at least one authentication answer embedding vector in a textual embedding space by inputting the at least one authentication answer into at least one embedding engine;
wherein the at least one authentication answer embedding vector in the textual embedding space represents a location in the textual embedding space;
wherein the location in the textual embedding space represents:
(i) the at least one word in the at least one authentication answer, and
(ii) a discourse of the at least one phrase of words in the at least one authentication answer;
wherein the discourse is based on the at least one word in the at least one authentication answer;
storing, by the processor, the at least one authentication answer embedding vector for each of the plurality of identity-authentication questions of the at least one verified user in a non-transient memory;
receiving, by the processor, at least one unverified-user authentication answer for at least one specific identity-authentication question from the plurality of identity-authentication questions of the at least one verified user, in response to posing to at least one unverified user in an identity-authentication session, the at least one specific identity-authentication question;

generating, by the processor, at least one unverified-user authentication answer embedding vector representing at least one unverified-user authentication answer location in the textual embedding space by inputting the at least one unverified-user authentication answer into the at least one embedding engine for each of the at least one specific identity-authentication question;

computing, by the processor, an embedding space distance between the at least one unverified-user authentication answer location and the location in the textual embedding space of the at least one authentication answer embedding vector for each of the at least one specific identity-authentication question of the at least one verified user posed to the at least one unverified user;

wherein, when the at least one unverified user is the at least one verified user, the embedding space distance accounts for semantic variations, discourse variations, or both in the at least one unverified-user authentication answer relative to the at least one authentication answer previously provided in the initial authentication question-answer registration;

computing, by the processor, an accumulated similarity score based the embedding space distance computed for each of the at least one specific identity-authentication question posed to the at least one unverified user; and identifying, by the processor, the at least one unverified user as the at least one verified user when the accumulated similarity score is higher than a predefined verification threshold score.

2. The method according to claim 1, wherein the receiving of the at least one unverified-user authentication answer in the identity-authentication session comprises receiving a request by the at least one verified user to perform high-risk operations in an account associated with the at least one verified user.

3. The method according to claim 2, wherein the predefined verification threshold score is based on a level of risk to perform the high-risk operations.

4. The method according to claim 1, wherein the storing of the at least one authentication answer embedding vector for each of the plurality of identity-authentication questions of the at least one verified user comprises encrypting the at least one authentication answer embedding vector for each of the plurality of identity-authentication questions of the at least one verified user using a cryptographic algorithm.

5. The method according to claim 4, wherein the computing of the embedding space distance based on each of the at least one specific identity-authentication question comprises decrypting the at least one authentication answer embedding vector for each of the at least one specific identity-authentication question using the cryptographic algorithm.

6. The method according to claim 1, wherein the at least one authentication answer embedding vector comprises an array of numerical tokens representing coordinates of the location in the textual embedding space.

7. The method according to claim 1, wherein the at least one embedding engine uses algorithms selected from the group consisting of a Word2Vec algorithm, a Doc2Vec algorithm, a sentenceBERT algorithm, an InferSent algorithm, and a universal sentence encoder algorithm.

8. The method according to claim 1, wherein the receiving from the at least one unverified user, the at least one unverified-user authentication answer for the at least one specific identity-authentication question from the plurality of identity-authentication questions of the at least one verified user comprises receiving a text output from a speech-to-text conversion algorithm in response to the at least one unverified user speaking the at least one unverified-user authentication answer over a communication channel in response to posing to the at least one unverified user in an identity-authentication session, the at least one specific identity-authentication question spoken in a conversation with a second user over the communication channel.

9. The method according to claim 1, wherein the computing of the accumulated similarity score is based on an order in which each of the at least one specific identity-authentication question of the at least one verified user is posed to the at least one unverified user.

10. The method according to claim 1, wherein computing the embedding space distance comprises applying cosine similarity to the at least one unverified-user authentication answer embedding vector and the at least one authentication answer embedding vector for the at least one specific identity-authentication question of the at least one verified user posed to the at least one unverified user.

11. A system, comprising:

a non-transient memory; and at least one processor that is configured to execute software code stored in the non-transient memory that causes the at least one processor to:

receive at least one authentication answer to each of a plurality of identity-authentication questions provided in an initial authentication question-answer registration by at least one verified user;

generate at least one authentication answer embedding vector in a textual embedding space by inputting the at least one authentication answer into at least one embedding engine;

wherein the at least one authentication answer embedding vector in the textual embedding space represents a location in the textual embedding space;

wherein the location in the textual embedding space represents:

(i) at least one word in the at least one authentication answer, and (ii) a discourse of at least one phrase of words in the at least one authentication answer;

receive at least one unverified-user authentication answer for at least one specific identity-authentication question from the plurality of identity-authentication questions of the at least one verified user, in response to posing to at least one unverified user in an identity-authentication session, the at least one specific identity-authentication question;

generate at least one unverified-user authentication answer embedding vector representing at least one unverified-user authentication answer location in the textual embedding space by inputting the at least one unverified-user authentication answer into the at least one embedding engine for each of the at least one specific identity-authentication question;

compute an embedding space distance between the at least one unverified-user authentication answer location and the location in the textual embedding space of the at least one authentication answer embedding vector for each of the at least one specific identity-authentication question of the at least one verified user posed to the at least one unverified user;

wherein, when the at least one unverified user is the at least one verified user, the embedding space distance accounts for semantic variations, discourse variations, or both in the at least one unverified-user authentication answer relative to the at least one authentication answer previously provided in the initial authentication question-answer registration;

compute an accumulated similarity score based the embedding space distance computed for each of the at least one specific identity-authentication question posed to the at least one unverified user; and identify the at least one unverified user as the at least one verified user when the accumulated similarity score is higher than a predefined verification threshold score.

12. The system according to claim 11, wherein the at least one processor is configured to receive the at least one unverified-user authentication answer in the identity-authentication session by receiving a request by the at least one verified user to perform high-risk operations in an account associated with the at least one verified user.

13. The system according to claim 12, wherein the predefined verification threshold score is based on a level of risk to perform the high-risk operations.

14. The system according to claim 11, wherein the at least one processor is configured to store the at least one authentication answer embedding vector for each of the plurality of identity-authentication questions of the at least one verified user by encrypting the at least one authentication answer embedding vector for each of the plurality of identity-authentication questions of the at least one verified user using a cryptographic algorithm.

15. The system according to claim 14, wherein the at least one processor is configured to compute the embedding space distance based on each of the at least one specific identity-authentication question comprises decrypting the at least one authentication answer embedding vector for each of the at least one specific identity-authentication question using the cryptographic algorithm.

16. The system according to claim 11, wherein the at least one authentication answer embedding vector comprises an array of numerical tokens representing coordinates of the location in the textual embedding space.

17. The system according to claim 11, wherein the at least one embedding engine uses algorithms selected from the group consisting of a Word2Vec algorithm, a Doc2Vec algorithm, a sentenceBERT algorithm, an InferSent algorithm, and a universal sentence encoder algorithm.

18. The system according to claim 11, wherein the at least one processor is configured to receive from the at least one unverified user, the at least one unverified-user authentication answer for the at least one specific identity-authentication question from the plurality of identity-authentication questions of the at least one verified user by receiving a text output from a speech-to-text conversion algorithm in response to the at least one unverified user speaking the at least one unverified-user authentication answer over a communication channel in response to posing to the at least one unverified user in an identity-authentication session, the at least one specific identity-authentication question spoken in a conversation with a second user over the communication channel.

19. The system according to claim 11, wherein the at least one processor is configured to compute the accumulated similarity score based on an order in which each of the at least one specific identity-authentication question of the at least one verified user is posed to the at least one unverified user.

20. The system according to claim 11, wherein the at least one processor is configured to compute the embedding space distance by applying cosine similarity to the at least one unverified-user authentication answer embedding vector and the at least one authentication answer embedding vector for the at least one specific identity-authentication question of the at least one verified user posed to the at least one unverified user.

* * * * *